(12) United States Patent
Zama et al.

(10) Patent No.: US 9,601,745 B2
(45) Date of Patent: Mar. 21, 2017

(54) NON-AQUEOUS ELECTROLYTE SECONDARY BATTERY

(71) Applicant: NEC ENERGY DEVICES, LTD., Sagamihara-shi, Kanagawa (JP)

(72) Inventors: Koichi Zama, Sagamihara (JP); Akio Ukita, Sagamihara (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 11 days.

(21) Appl. No.: 14/767,804

(22) PCT Filed: Mar. 3, 2014

(86) PCT No.: PCT/JP2014/055255
§ 371 (c)(1),
(2) Date: Aug. 13, 2015

(87) PCT Pub. No.: WO2014/136714
PCT Pub. Date: Sep. 12, 2014

(65) Prior Publication Data
US 2015/0380716 A1    Dec. 31, 2015

(30) Foreign Application Priority Data

Mar. 7, 2013  (JP) ................................. 2013-045344

(51) Int. Cl.
*H01M 2/26*     (2006.01)
*H01M 10/0525*  (2010.01)
(Continued)

(52) U.S. Cl.
CPC ........... *H01M 2/26* (2013.01); *H01M 10/052* (2013.01); *H01M 10/0525* (2013.01);
(Continued)

(58) Field of Classification Search
CPC .... H01M 4/13; H01M 2004/021; H01M 2/26; H01M 10/052; H01M 10/0525;
(Continued)

(56) References Cited

U.S. PATENT DOCUMENTS

2009/0246612 A1  10/2009  Naoi et al.
2010/0221607 A1   9/2010  Hatanaka et al.
2012/0058375 A1   3/2012  Tanaka et al.

FOREIGN PATENT DOCUMENTS

GB      1159817 A      7/1969
JP      07-302616 A   11/1995
(Continued)

OTHER PUBLICATIONS

International Search Report for PCT/JP2014/055255 dated Apr. 28, 2014.
(Continued)

*Primary Examiner* — Brittany Raymond
(74) *Attorney, Agent, or Firm* — Sughrue Mion, PLLC

(57) ABSTRACT

A non-aqueous electrolyte secondary battery includes a negative electrode in which a negative electrode active material layer is formed on a negative electrode collector, and a positive electrode laminated on the negative electrode through a separator, in which a positive electrode active material layer is formed on a positive electrode collector. The positive electrode active material layer on a surface of a positive electrode tab drawn from the positive electrode collector has a region which extends in a drawing direction of the positive electrode tab, exceeding a leading end line of a vertically projected negative electrode active material layer opposed to the positive electrode active material layer and in which an existing amount of the positive electrode active material layer is reduced toward its leading end portion.

3 Claims, 8 Drawing Sheets

(51) Int. Cl.
*H01M 10/0585* (2010.01)
*H01M 10/052* (2010.01)
*H01M 10/42* (2006.01)
H01M 4/13 (2010.01)
H01M 10/0566 (2010.01)
H01M 4/02 (2006.01)

(52) U.S. Cl.
CPC ... *H01M 10/0585* (2013.01); *H01M 10/4235* (2013.01); *H01M 4/13* (2013.01); *H01M 10/0566* (2013.01); *H01M 2004/021* (2013.01); *Y02E 60/122* (2013.01)

(58) Field of Classification Search
CPC ......... H01M 10/0566; H01M 10/0585; H01M 10/4235; Y02E 60/122
See application file for complete search history.

(56) References Cited

FOREIGN PATENT DOCUMENTS

| | | |
|---|---|---|
| JP | 2002-222643 A | 8/2002 |
| JP | 2002-252023 A | 9/2002 |
| JP | 2006-147392 A | 6/2006 |
| JP | 2009-238487 A | 10/2009 |
| JP | 2012-204335 A | 10/2012 |
| WO | 2009/008160 A1 | 1/2009 |

OTHER PUBLICATIONS

Communication dated Oct. 14, 2016, from the European Patent Office in counterpart European Application No. 14760377.3.

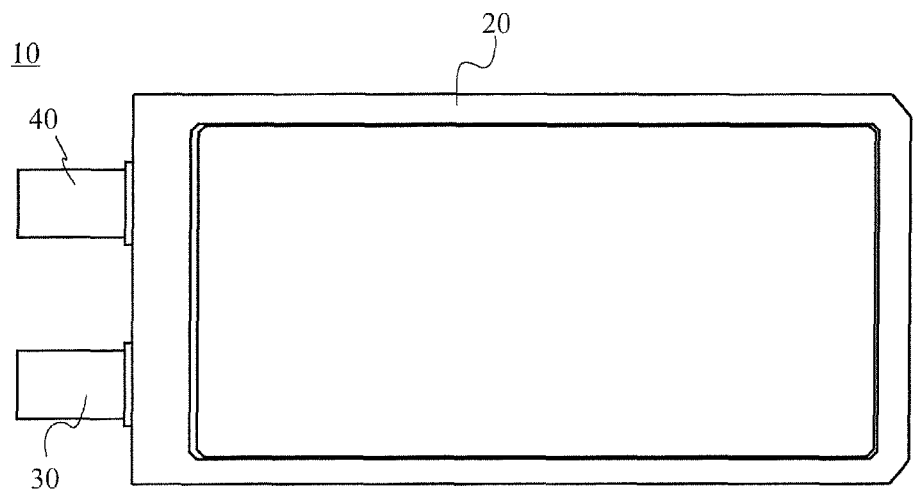
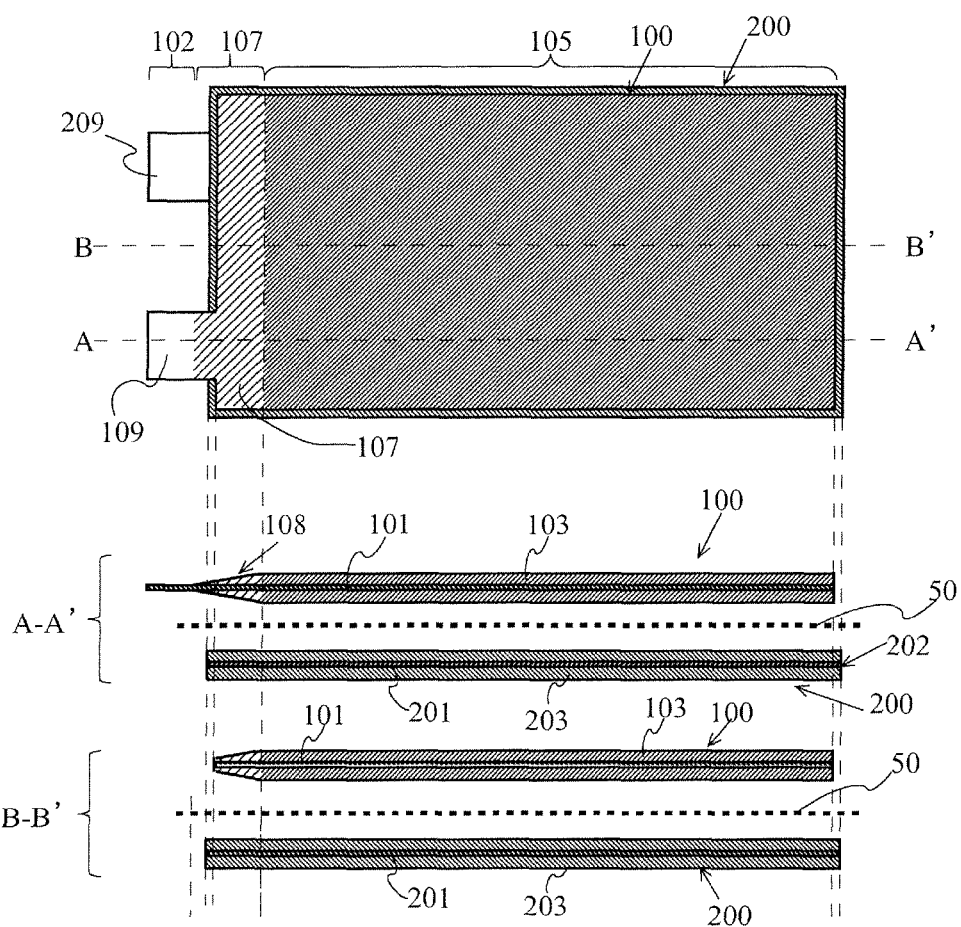

NON-AQUEOUS ELECTROLYTE SECONDARY BATTERY

CROSS REFERENCE TO RELATED APPLICATIONS

This application is a National Stage of International Application No. PCT/JP2014/055255 filed Mar. 3, 2014, claiming priority based on Japanese Patent Application No. 2013-045344, filed Mar. 7, 2013, the contents of all of which are incorporated herein by reference in their entirety.

TECHNICAL FIELD

The present invention relates to a non-aqueous electrolyte secondary battery and, more particularly, to a non-aqueous secondary battery capable of exhibiting high reliability and a high charge-discharge capacity even when applied with impact or even under a high temperature environment.

BACKGROUND ART

A lithium-ion secondary battery excellent in a charge-discharge capacity characteristic and the like can be reduced in size and weight and has a high energy density. Thus, the lithium-ion secondary battery has been used as a power source for a portable device, as a power source for an electric bicycle, an electric car, and the like, or for backup of a commercial power source, and various proposals are being made for improvement of performance thereof.

In the lithium-ion secondary battery, lithium ions are transferred from a positive electrode side to a negative electrode side during charging. At this time, lithium may be deposited as dendrites to a peripheral portion of the negative electrode to cause a short circuit with an opposed electrode. Thus, in order to prevent this, a configuration is proposed, in which an outer peripheral portion of the positive electrode is disposed more inward than an outer peripheral portion of the negative electrode facing the positive electrode (see, for example, Patent Documents 1 and 2).

Further, in order to prevent internal leak due to falling of an active material from the peripheral portion of the electrode, a configuration is proposed, in which an insulating tape is adhered to a portion where a thickness is reduced by an inclination of a end portion of a positive electrode mixture (see, for example, Patent Document 3).

CITATION LIST

Patent Document

Patent Document 1: JP 2002-252023A
Patent Document 2: JP 07-302616A
Patent Document 3: JP 2006-147392A

DISCLOSURE OF THE INVENTION

Problems to be Solved by the Invention

The lithium-ion secondary battery is widely used as a practical non-aqueous electrolyte secondary battery in which lithium does not exist in a metallic state throughout charging and discharging.

However, when the lithium ions from the positive electrode side cannot be received by the negative electrode side during charging, metallic lithium may be deposited as dendrites to the peripheral portion of the negative electrode.

FIGS. 8A and 8B are views each for explaining a conventional lithium-ion battery.

FIG. 8A is a plan view illustrating a positional relationship between a positive electrode 100 and a negative electrode 200 and, in particular, a state where the positive electrode is disposed on the negative electrode as viewed from the positive electrode side. FIG. 8B is a view illustrating, including a separator, a cross-section taken along a line A-A' of FIG. 8A, in which a thickness direction is enlarged.

The positive electrode 100 has an outer shape smaller than that of the negative electrode 200, and the negative electrode exists in every portion where the positive electrode faces the negative electrode through the separator 50.

To prevent the lithium from being deposited as dendrites to the peripheral portion of the negative electrode by thus defining the sizes of the positive and negative electrodes is indispensable in designing the lithium-ion battery.

However, in the configuration where the negative electrode is made larger in size than the positive electrode, when the separator provided between the positive and negative electrodes shrinks at high temperature, a short circuit may occur between the positive and negative electrodes, in particular, between a positive electrode lead-out tab onto which a positive electrode active material is not coated and the negative electrode to cause a high current to flow.

It is generally thought such a short circuit can be prevented by disposing the insulating tape at a tapered portion of a coating end portion of the positive electrode active material, as described in Patent Document 3.

However, upon charging, the lithium ion may be transferred from a portion covered with the insulating tape to a portion not covered therewith, and a transfer amount of the lithium ion from the portion not covered the insulating tape may increase to cause the lithium to be deposited as dendrites to the peripheral portion of the negative electrode.

An object of the present invention is to provide a lithium-ion battery capable of preventing both a short circuit between the positive electrode lead-out tab and a negative electrode active material layer and deposition of the lithium to increase reliability of the lithium-ion battery by reducing diffusion of the lithium ion from the peripheral portion of the positive electrode upon charging of the non-aqueous electrolyte secondary battery and reducing conductivity of a surface of the positive electrode lead-out tab.

Means for Solving the Problems

The problem can be solved by a non-aqueous electrolyte secondary battery of the present invention including: a negative electrode in which a negative electrode active material layer is formed on a negative electrode collector; and a positive electrode laminated on the negative electrode through a separator, in which a positive electrode active material layer is formed on a positive electrode collector, wherein the positive electrode active material layer on a surface of a positive electrode tab drawn from the positive electrode collector has a region which extends in a drawing direction of the positive electrode tab, exceeding a leading end line of a vertically projected negative electrode active material layer opposed to the positive electrode active material layer and in which an existing amount of the positive electrode active material layer is reduced at its leading end portion.

Further, in the above non-aqueous electrolyte secondary battery, the region where an existing amount of the positive electrode active material layer is reduced is formed as a slope whose thickness is reduced in the drawing direction of the positive electrode tab or as a region in which an existing ratio of the positive electrode active material is reduced.

Further, in the above non-aqueous electrolyte secondary battery, the positive electrode tab and a negative electrode tab are drawn in opposite directions to each other, and an insulating member extending in the drawing direction of the positive electrode tab from a part of the positive electrode lead-out tab where the existing amount of the positive electrode active material is reduced is provided, the insulating member having such a thickness that an end portion of the insulating member at an opposite side to a leading end side of the positive electrode in the drawing direction reaches the negative electrode collector, exceeding a surface of the negative electrode active material layer of the negative electrode adjacent to the positive electrode tab in a laminating direction thereof.

Advantages of the Invention

In the non-aqueous electrolyte secondary battery according to the present invention, the positive electrode active material layer on the surface of the positive electrode lead-out tab drawn from the positive electrode collector extends in the drawing direction of the positive electrode lead-out tab, exceeding a leading end line of a vertically projected negative electrode active material layer opposed to the positive electrode active material layer. Further, the existing amount of the positive electrode active material layer extending in the drawing direction of the positive electrode lead-out tab is reduced toward its leading end.

Thus, the amount of lithium ion to be transferred, during charging, to the outer peripheral portion of the negative electrode opposed to the positive electrode is reduced, thereby preventing the lithium ion from being deposited as dendrites.

Further, even when the separator shrinks at high temperature, it is possible to prevent a high short circuit current from flowing when the positive electrode active material layer is brought into direct contact with the negative electrode since a conductivity of the positive electrode active material is lower than that of an aluminum surface, whereby a highly reliable battery can be provided.

BRIEF DESCRIPTION OF THE DRAWINGS

FIGS. 1A to 1D are views each illustrating a non-aqueous electrolyte secondary battery according to the present invention, in which FIG. 1A is a plan view illustrating an outer appearance, FIG. 1B is a view illustrating a positional relationship between positive and negative electrodes, FIG. 1C is a cross-sectional view obtained by cutting a positive electrode tab portion of FIG. 1B along a line A-A', which illustrates a positional relationship among the positive and negative electrodes and a separator, and FIG. 1D is a cross-sectional view obtained by cutting the positive and negative electrodes along a line B-B', which illustrates a positional relationship among the positive and negative electrodes and a separator;

FIGS. 2A and 2B are views each illustrating a positional relationship between a region provided in a positive electrode lead-out tab, where an existing amount of a positive electrode active material is small and negative electrode, in which FIG. 2A is a view illustrating an example in which the region where the existing amount of the positive electrode active material is small is formed in a tapered shape, and FIG. 2B is a view illustrating an example in which the region where the existing amount of the active material is small is formed by a step portion;

FIGS. 3A and 3B are views each illustrating an example of a battery according to the present invention, in which FIG. 3A is a plan view illustrating a laminate of battery elements housed inside a covering material as viewed from a laminating surface, and FIG. 3B is a cross-sectional view taken along a line C-C' of FIG. 3A;

FIGS. 4A and 4B are views illustrating a structure that uses an insulating member to suppress movement of the negative electrode in the present invention, in which FIG. 4A is a view illustrating an example of the structure for suppressing the movement of the negative electrode, and FIG. 4B is a view illustrating another example of the structure for suppressing the movement of the negative electrode;

FIGS. 5A and 5B are views each illustrating a manufacturing process of an electrode according to the present invention, in which FIG. 5A is a view illustrating a coating processing performed using a die coater, and FIG. 5B is a cross-sectional view taken along a line B-B' of FIG. 5A;

FIGS. 6A and 6B are views each illustrating a manufacturing process of the electrode according to the present invention and, in particular, a compression process of the active material layer formed on a collector surface, in which FIG. 6A is a view illustrating a case where an electrode in which an end portion of a coating layer is formed in a tapered shape is manufactured, and FIG. 6B is a view illustrating an electrode in which the coating layer is reduced in thickness at the end portion thereof by formation of a step portion;

FIGS. 7A and 7B are views each illustrating a cutout process of the electrode according to the present invention, in which FIG. 7A is a partially cutout view of the strip-shaped collector, and FIG. 7B is a view illustrating a cut out electrode.

BEST MODE FOR CARRYING OUT THE INVENTION

Figure 2A:
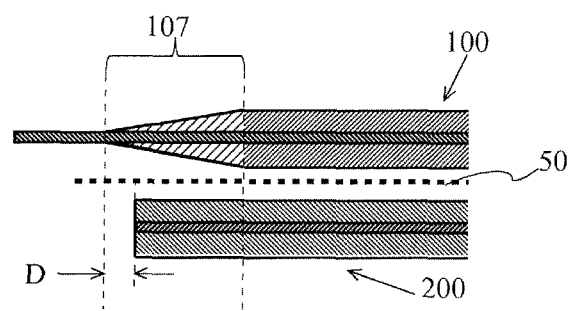

The present invention will be described with reference to the drawings.

FIG. 1A is a plan view illustrating an outer appearance. A non-aqueous electrolyte secondary battery 10 according to the present invention has a configuration in which at least one unit battery having positive and negative electrodes which are disposed opposite to each other through a separator is sealed by a film-like covering material 20 and the like, and a positive electrode terminal 30 and a negative electrode terminal 40 are drawn from the film-like covering material 20.

FIG. 1B is a view illustrating an arrangement of the positive and negative electrodes and, in particular, a positional relationship among a positive electrode 100, a negative electrode 200, and the separator (not illustrated). FIG. 1C is a view illustrating a cross-section taken along a line A-A' of FIG. 1B and, in particular, a positional relationship among the positive electrode 100, a separator 50, and the negative electrode 200. FIG. 1D is a view illustrating a cross-section taken along a line B-B' of FIG. 1B and, in particular, a positional relationship among the positive electrode 100, the separator 50, and the negative electrode 200.

The positive electrode 100 of the present invention has, on a surface of a positive electrode collector 101, a positive electrode active material layer 103, and the negative electrode 200 has, on a surface of a negative electrode collector 201, a negative electrode active material layer 203.

The positive electrode active material layer 103 has a high density region 105 for charging or discharging of a battery, where a packing density of the active material layer is increased by compression and a region 107 adjacent to an active material non-coating region 102 of a positive electrode lead-out tab 109 drawn from the positive electrode collector 101, where an existing amount of the active material is smaller than that in the high density region 105.

The region 107 where the existing amount of the active material is small can be obtained by forming a step portion from the adjacent high density region so as to reduce a coating amount of the active material or by forming a tapered portion 108 where the active material is coated in such a manner that a thickness of the active material increases toward the high density region 105 from the non-coating region 102.

The negative electrode 200 has, on the surface of the negative electrode collector 201, the negative electrode active material layer 203, and a negative electrode collector lead-out tab 209 is drawn from the negative electrode collector 201. The negative electrode active material layer 203 of the negative electrode 200 other than a negative electrode part facing the positive electrode lead-out tab has an area larger than that of the positive electrode active material layer, and an arrangement is made such that the negative electrode exists in every portion where the positive electrode faces the negative electrode through the separator, whereby a current density is prevented from being increased in the peripheral portion of the negative electrode.

This prevents failure in receiving, at the peripheral portion of the negative electrode, the lithium ion that is transferred to the negative electrode side during charging, to thereby prevent metallic lithium from being deposited as dendrites.

On the other hand, as illustrated in FIGS. 1B and 1C, in the vicinity of the positive electrode lead-out tab, the region 107 provided in the positive electrode lead-out tab 109, where the existing amount of the active material is small extends up to the peripheral portion of the negative electrode that the positive electrode faces through the separator.

On a negative electrode side surface of the positive electrode lead-out tab 109, the region 107 where the existing amount of the active material is small, extends up to a region where the negative electrode does not exist. However, the amount of the lithium ion to be transferred to the peripheral portion of the negative electrode during charging of the battery is smaller than any other portions, so that deposition of the metallic lithium by the lithium ion transferred from the portion protruding from an outer periphery of the negative electrode can be prevented.

Figure 2B:
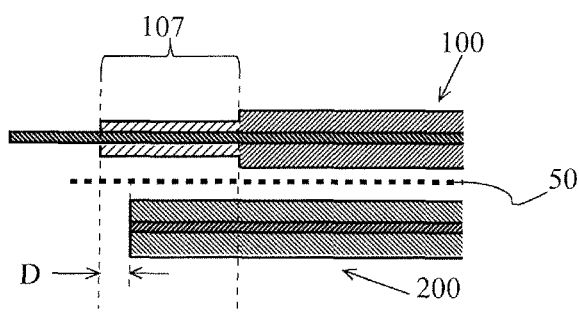

FIGS. 2A and 2B are views each illustrating a positional relationship between the region provided in the positive electrode lead-out tab, where the existing amount of the positive electrode active material is small and the negative electrode. FIG. 2A is a view illustrating an example in which the region 107 where the existing amount of the positive electrode active material is small is formed in a tapered shape.

Although depending on a shape (width of the non-coating region, thickness of a collector) of an electrode to be produced, in order to exhibit the effect of the present invention, a porosity of the compressed active material layer, and the like, the region 107 where the existing amount of the active material is small needs to satisfy a condition that an amount of the lithium ion to be inserted/released with respect to the negative electrode active material of a region opposite thereto is larger than an amount of the lithium ion to be inserted/released with respect to the positive electrode active material thereof.

Further, it is preferable to set a distance D from a leading end portion of the region 107 where the existing amount of the active material is small in a drawing direction of the positive electrode lead-out tab to a leading end portion of the negative electrode to 8 mm or less. This is because when the distance D is set to 8 mm or less, deposition of the lithium at the leading end portion of the negative electrode is sufficiently suppressed. On the other hand, in order to prevent a short circuit between the positive electrode lead-out tab and the negative electrode active material layer, it is preferable to set the distance D to 3 mm or larger. Further, it is necessary to set the distance D smaller than a width of the region 107 where the existing amount of the active material is small.

FIG. 2B is a view illustrating an example in which the region 107 where the existing amount of the active material is small is formed by a step portion. As in the case of the tapered portion illustrated in FIG. 2A, it is preferable to set a distance D from the leading end portion of the region 107 where the existing amount of the active material is small in the drawing direction of the positive electrode lead-out tab to the leading end portion of the negative electrode to 8 mm or less. On the other hand, in order to prevent a short circuit between the positive electrode lead-out tab and negative electrode active material layer, it is preferable to set the distance D to 3 mm or larger. Further, it is necessary to set the distance D smaller than the width of the region 107 where the existing amount of the active material is small.

As described above, the region 107 where the existing amount of the active material is small is provided on the surface of the positive electrode lead-out tab. Thus, even when a positive electrode active material coated surface of the positive electrode lead-out tab contacts its opposing negative electrode active material coated surface due to heat shrinking of the separator, current to flow is limited as compared to a case where an aluminum surface of the positive electrode lead-out tab and the surface of the negative electrode are brought into contact with each other since a conductivity of the positive electrode active material is much lower than that of the aluminum.

Thus, it is possible to enhance safety as compared to the case where the aluminum surface of the positive electrode lead-out tab and the negative electrode surface are brought into direct contact with each other. In particular, by using, as the positive electrode active material, a lithium-manganese composite oxide, which has a lower conductivity than a lithium-cobalt composite oxide, a lithium-ion battery with higher safety can be provided.

Figure 3A:
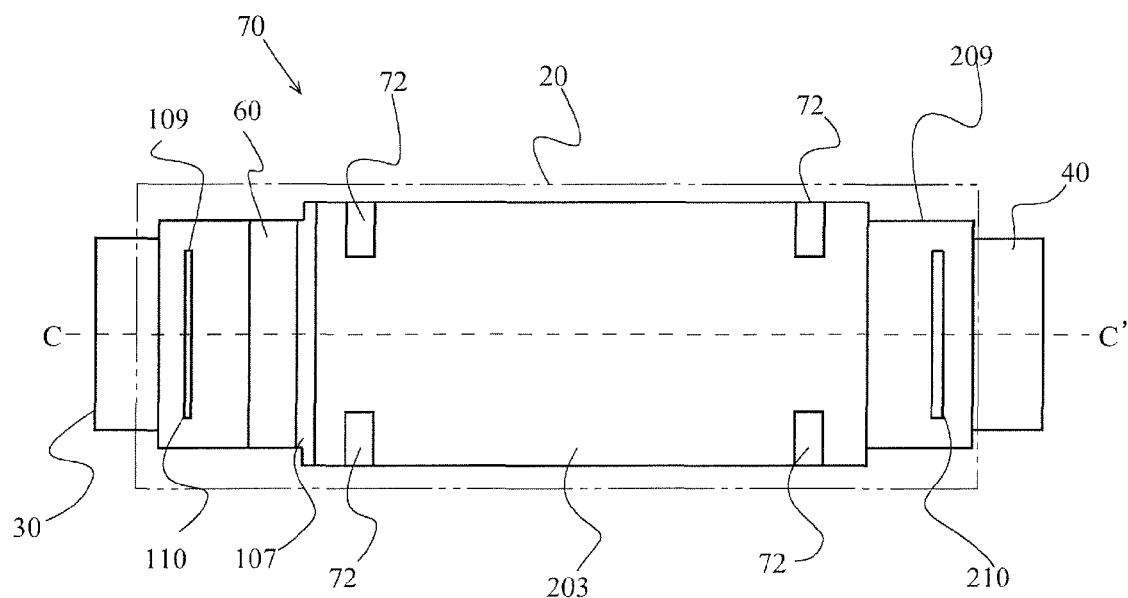
Figure 3B:
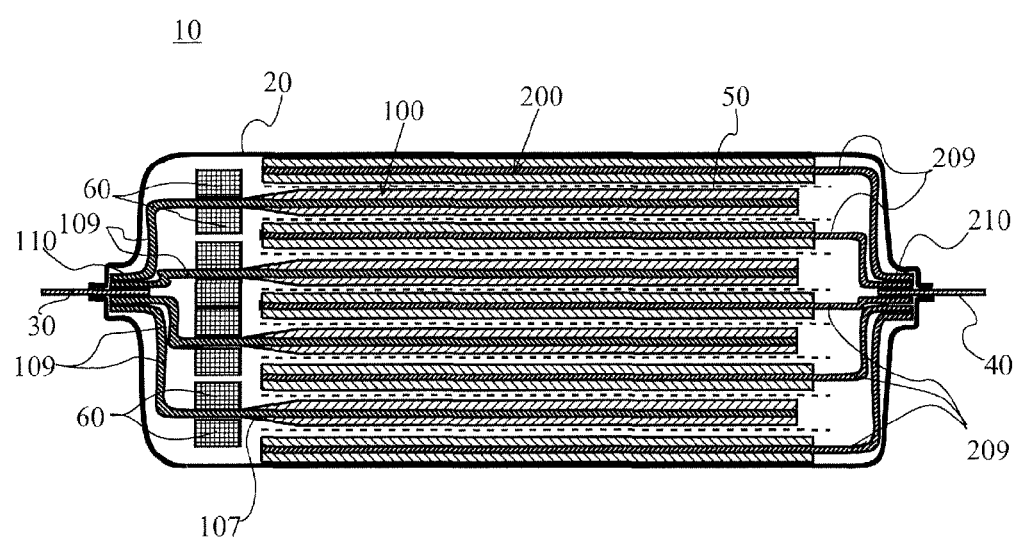

FIGS. 3A and 3B are views each illustrating an example of a battery according to the present invention. FIG. 3A is a plan view illustrating a laminate of battery elements housed inside the covering material as viewed from a laminating surface, and FIG. 3B is a cross-sectional view taken along a line C-C' of FIG. 3A.

The non-aqueous electrolyte secondary battery 10 has a laminate 70 of battery elements inside the film-like covering material 20 denoted by a virtual line.

In the battery illustrated in FIGS. 3A and 3B, the positive electrode lead-out tab 109 and the negative electrode lead-out tab 209 are drawn in opposite directions to each other, and four pairs of the positive and negative electrodes 100 and 200 are laminated through the separators 50.

An insulating member 60 such as an insulating adhesive tape is adhered to a region ranging from the drawing portion of the positive electrode lead-out tab 109 of each positive electrode to the region 107 where the existing amount of the active material is small.

The laminate 70 of the battery elements can be integrated as follows. The positive and negative electrodes are laminated through the separators. Then, a plurality of the positive electrode lead-out tabs 109 and a plurality of the negative electrode lead-out tab 209 are joined, by ultrasonic welding or the like, to the positive electrode terminal 30 and the negative electrode terminal 40, respectively, at a positive electrode side joint portion 110 and a negative electrode side joint portion 210, respectively. Finally, a binding tape 72 is adhered at a plurality of positions.

The insulating member has a thickness large enough to reach, on a side thereof opposite to a side at which the positive electrode tab is drawn, an end face of the negative electrode active material layer of each of the negative electrode adjacent to each other in a lamination direction of the positive electrode lead-out tabs, or an end face of the negative electrode collector of each negative electrode.

By adhering, to the positive electrodes, the insulating member 60 having a thickness large enough to reach the end portion of each negative electrode 200, the end portion of each negative electrode can be retained.

Thus, even when the battery receives a large impact in a direction toward the positive electrode lead-out tab to cause the negative electrode lead-out tab 209 to be cut off to move the negative electrode to the positive electrode lead-out tab side, the positive and negative electrodes can be prevented from being brought into contact with each other, whereby a non-aqueous electrolyte secondary battery with higher safety can be provided.

Further, in the battery according to the present invention, the electrodes of the same polarity are disposed at both end portions of the laminate, respectively. In the illustrated example, the negative electrodes 200 are disposed at the both end portions, respectively. Thus, even if the film-like covering material 20 is broken, flowing of a short circuit current can be prevented by an external conductive member, whereby safety can be enhanced.

Figure 4A:
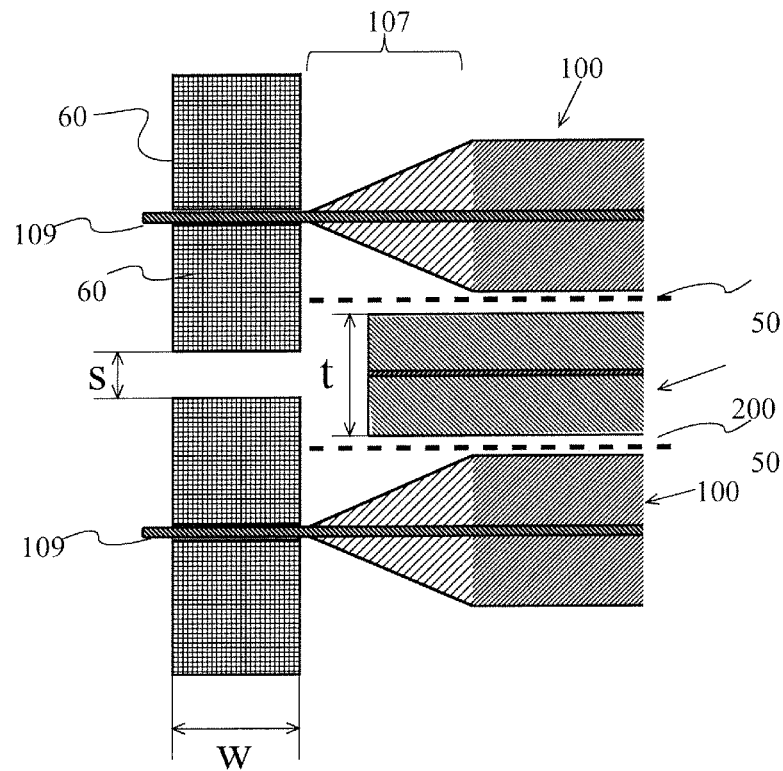
Figure 4B:
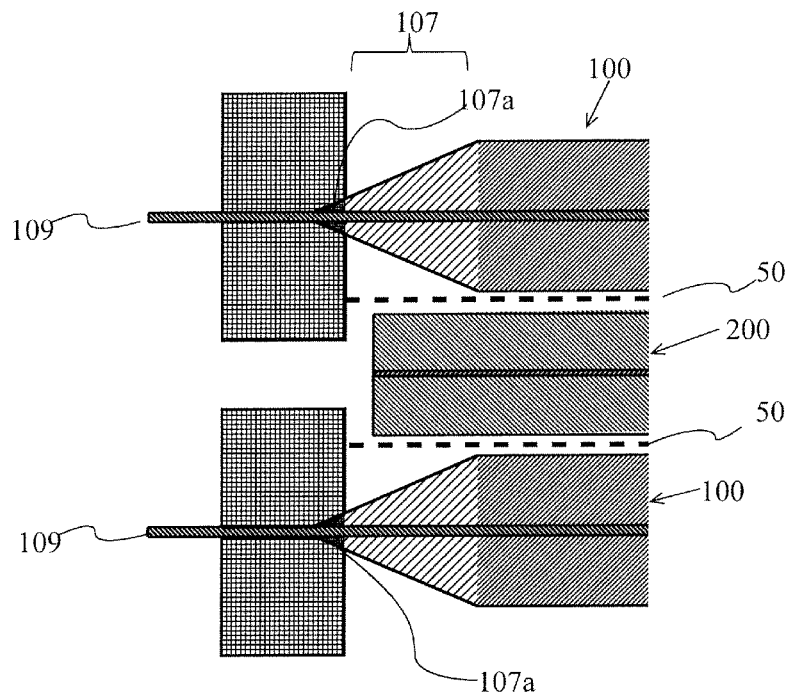

FIGS. 4A and 4B are views illustrating a structure that uses the insulating member to suppress movement of the negative electrode in the present invention. FIG. 4A is a view illustrating an example of the structure for suppressing the movement of the negative electrode, and FIG. 4B is a view illustrating another example of the structure for suppressing the movement of the negative electrode.

As illustrated in FIG. 4A, the insulating member 60 such as an insulating adhesive tape is adhered to the surface of the positive electrode lead-out tab 109 of the positive electrode 100 over a region between the drawing portion of the positive electrode lead-out tab 109 and the region 107 where the existing amount of the active material is small.

The insulating member 60 extends in the lamination direction of the battery laminate and reaches to a portion not exceeding ½ of a thickness of an end face of the negative electrode 200.

Specifically, the insulating member 60 is disposed so as to satisfy $0 \leq s \leq 0.8t$ (s: space between adjacent insulating members 60, t: thickness of the negative electrode 200), whereby it is possible to suppress the negative electrode from being moved upon application of impact.

Further, it is preferable to set a width W of the insulating member to a value equal to or larger than 4 mm and equal to or smaller than 12 mm. When the width W is smaller than 4 mm, the movement suppressing effect is not sufficiently exhibited; while when the width W is larger than 12 mm, a battery volume not related to a battery capacity is disadvantageously increased.

In the example of FIG. 4B, a part of the tapered portion of the region 107 where the existing amount of the active material is small is covered by the insulating member 60.

An electrolyte impermeable portion 107a is formed at the adhesion portion where a part of the tapered portion of the region 107 where the existing amount of the active material is small is covered by the insulating member.

The formation of the electrolyte impermeable portion 107a can prevent the lithium ion from being transferred during charging from the part of the tapered portion that is covered by the insulating member to a portion thereof not covered by the insulating member.

As a result, an amount of the lithium ion to be transferred from a boundary portion between the part of the tapered portion that is covered by the insulating member to portion thereof not covered by the insulating member to the negative electrode side, whereby it is possible to prevent the lithium ion from being deposited at the negative electrode side.

The electrolyte impermeable portion 107a can be formed by impregnation or filling of an insulating material stable to the electrolyte of the battery. For example, when the positive electrode is produced, filling of a thermoplastic resin material such as polypropylene is performed under pressure and heating.

The following describes an example of a manufacturing method for the non-aqueous electrolyte secondary battery according to the present invention.

A slurry obtained by dispersing, in N-methyl pyrrolidone which is an organic solvent, particles (volume average diameter 10 μm, measured by a laser diffraction-type particle-size-distribution measuring apparatus) as a main material for the positive electrode active material such as a lithium-manganese composite oxide, carbon black which is a conductivity imparting agent, and polyvinylidene fluoride (PVDF) which is a binder was successively coated onto a 20 μm thickness aluminum collector in a strip shape by using a die head to be described later, with a region of 18 mm from each of both ends set as a non-coating portion, followed by evaporation and drying of N-methyl pyrrolidone through a dry furnace, to form positive electrode mixture layer.

A solid content ratio in the positive electrode was positive electrode active material: conductivity imparting agent: PVDF=89:4:7 (mass %).

In a coating region adjacent to the non-coating region, a region where a coating thickness changes stepwise, i.e., a region where the existing amount of the active material is small is formed so that a pressure is not applied thereto upon compression.

A length of the step portion can be controlled by changing a shim of a die head. An electrode porosity of the positive electrode mixture layer before compression was about 50%. Then, by compressing this electrode by using a compressor, a high density region can be formed.

Figure 5A:
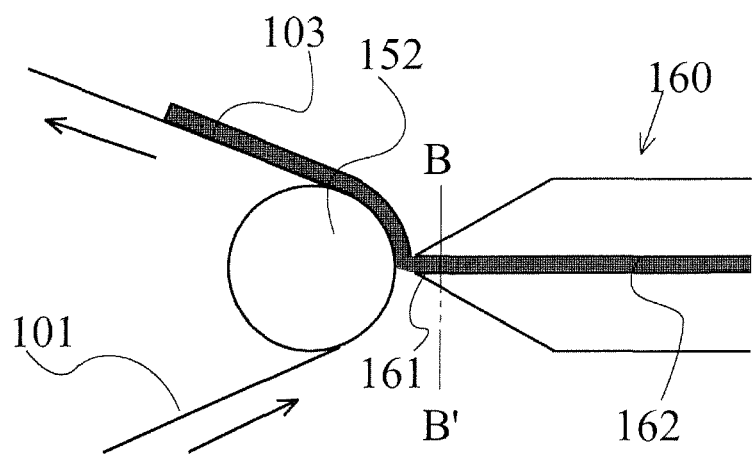
Figure 5B:
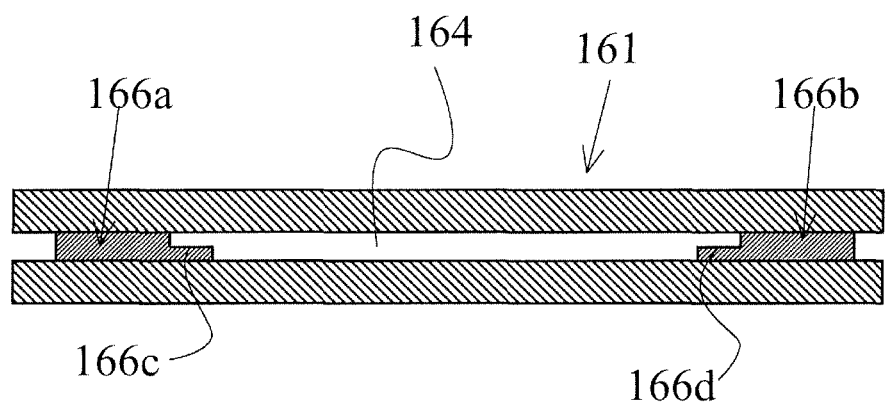

FIGS. 5A and 5B are views each illustrating a coating process using a die coater. FIG. 5A is a view illustrating operation of the die coater, and FIG. 5B is a cross-sectional view of a head portion taken along a line B-B' of FIG. 5A.

A die coater 150 is a device for successively coating the active material layer on the strip-shaped positive electrode collector 101 in a longitudinal direction thereof.

A slurry 162 obtained by dispersing, in an organic solvent such as N-methyl pyrrolidone, particles as a main material for the positive electrode active material such as a lithium-manganese composite oxide, carbon black which is a conductivity imparting agent, and a binder such as polyvinylidene fluoride was discharged at a predetermined pressure from a die head 161 of a slot die 160, whereby the slurry 162 can successively coated onto a surface of the strip-shaped positive electrode collector 101 moving on a backup roller 152.

FIG. 5B is a view illustrating a cross-section of the die head 161 taken along a line B-B'.

The die head 161 has, at both end portions of a discharge port 164 from which the slurry is discharged, space adjusting shims 166a and 166b for the discharge port 164. The space adjusting shims 166a and 166b have flow path limiting members 166c and 166d each having a tapered portion or step portion whose thickness is reduced toward a center of the discharge port 164.

Since the flow path limiting members are provided at both end portions of the die head 161 as described above, an amount of the slurry to be discharged from the both ends is reduced. As a result, a thickness at both end portions of a coating layer to be formed can be reduced in a tapered manner or stepwise toward an exposed surface of the collector.

Although the die coater is used to form the coating layer in the above description, a coating device of other type, such as a knife coating device may be used.

Figure 6A:
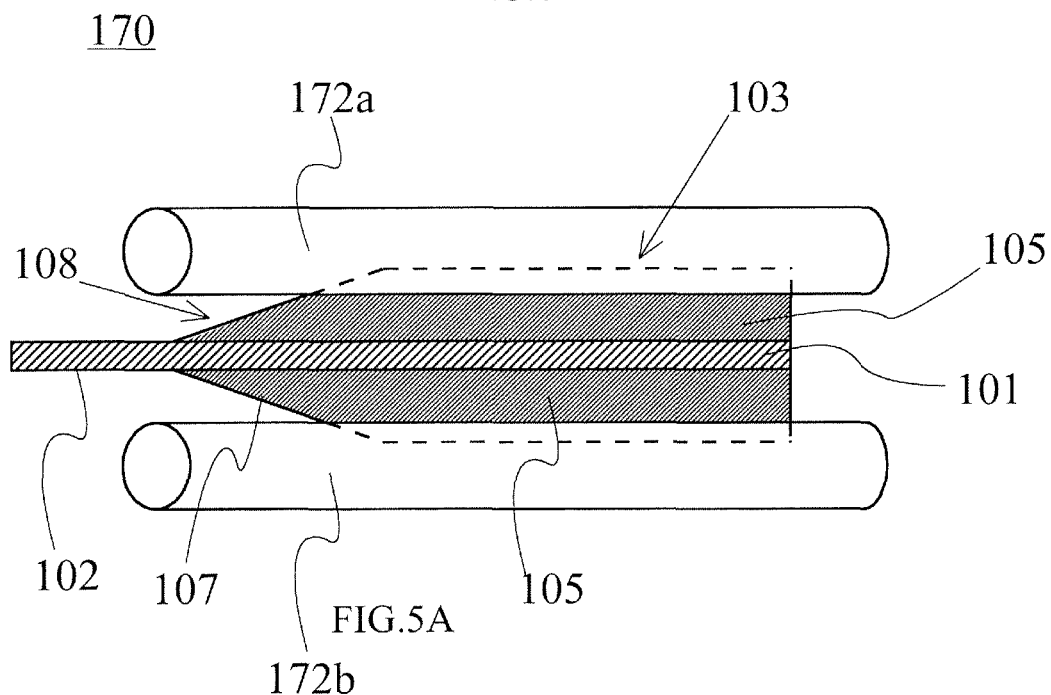
Figure 6B:
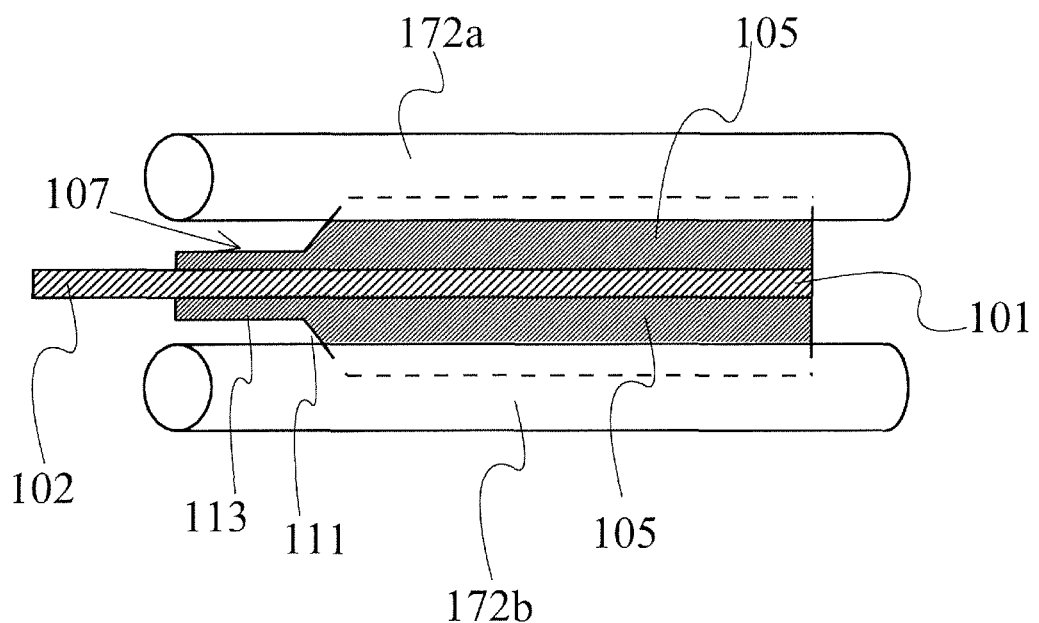

FIGS. 6A and 6B are views each illustrating a manufacturing process of the positive electrode according to the present invention and, in particular, a compression process of the active material layer formed on the collector surface. FIG. 6A is a view illustrating a case where an electrode in which the end portion of the coating layer is formed in a tapered shape is manufactured, and FIG. 6B is a view illustrating an electrode in which the coating layer is reduced in thickness at the end portion thereof by formation of the step portion.

A compression process 170 illustrated in FIG. 6A is a cross-sectional view after passage of roll presses 172a and 172b, obtained by cutting the positive electrode active material layer along a plane parallel to a plane passing through rotary axes of the roll presses 172a and 172b.

The positive electrode active material layer 103 successively coated on the positive electrode collector 101 in the longitudinal direction thereof is successively compressed by the roll presses 172a and 172b, with the result that the high density region 105 is formed. The active material layer at a region adjacent to the exposed surface 102 of the positive electrode collector 101 has the tapered portion 108.

Controlling a compression pressure allows formation of the region 107 where the compression pressure is not applied and thus the existing amount of the active material is small at a part of the tapered portion.

A compression process 170 illustrated in FIG. 6B is, as in the case of FIG. 6A, a cross-sectional view after passage of the roll presses 172a and 172b, obtained by cutting the positive electrode active material layer along a plane parallel to a plane passing through rotary axes of the roll presses 172a and 172b.

In FIG. 6A, the taper portion whose thickness is reduced toward the exposed surface of the collector is formed, while in FIG. 6B, a step portion 111 and a thin layer portion 113 having a small thickness are formed. By controlling the compression pressure such that the active material layer is compressed by the roll press except for the thin layer portion adjacent to the exposed surface of the collector and its adjacent step portion, the high density region 105 and region 107 where the existing amount of the active material is small can be formed.

In the above description, the compression is successively performed in the longitudinal direction of the collector; alternatively, however, other various types of compressors, such as a flat press machine, may be used.

Figure 7A:
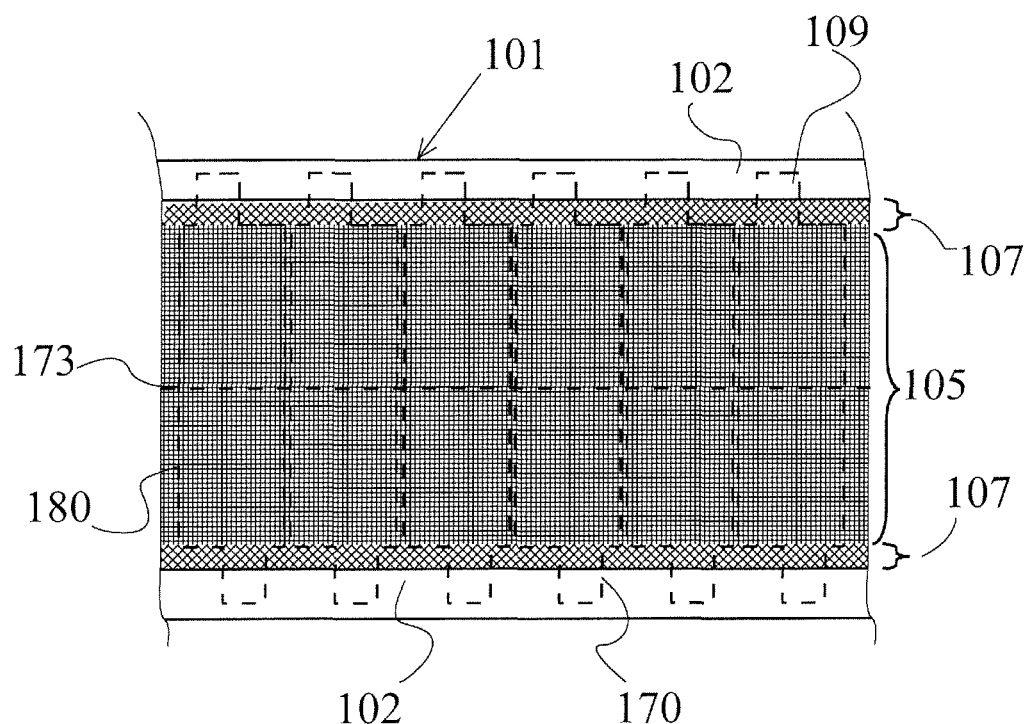
Figure 7B:
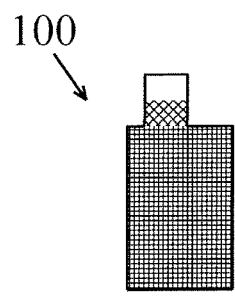
Figure 8A:
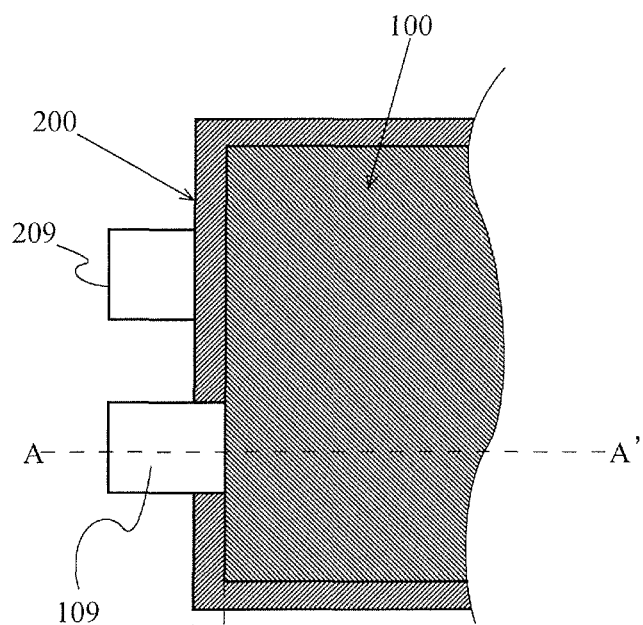
FIGS. 8A and 8B are views illustrating a conventional technology.
Figure 8B:
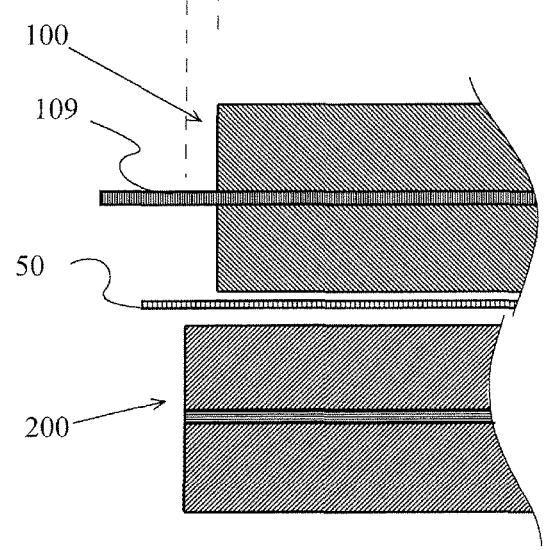

FIGS. 7A and 7B are views each illustrating a cutout process of the electrode according to the present invention.

FIG. 7A is a partially cutout view of the strip-shaped collector.

The active material layer is coated on the strip-shaped positive electrode collector 101 in the longitudinal direction thereof and then subjected to compression by the roll press as illustrated in FIGS. 6A and 6B. As a result, the high density region is formed at a center portion of the active material layer, and the region 107 where the existing amount of the active material is small which is not compressed by the roll press is formed at both end portions of the active material layer.

Then, punching is performed along the positive electrode lead-out tab 109, a cutting line 180 surrounding each unit electrode, and a center line 173, whereby the positive electrode illustrated in FIG. 7B can be effectively manufactured.

INDUSTRIAL APPLICABILITY

In the non-aqueous electrolyte secondary battery according to the present invention, the positive electrode active material layer on the surface of the positive electrode lead-out tab drawn from the positive electrode collector extends in the drawing direction of the positive electrode lead-out tab, exceeding a leading end line of a vertically projected negative electrode active material layer opposed to the positive electrode active material layer. Further, the existing amount of the positive electrode active material layer extending in the drawing direction of the positive electrode lead-out tab is reduced toward its leading end. Thus, the amount of lithium ion to be transferred, during charging, to the outer peripheral portion of the negative electrode opposed to the positive electrode is reduced, thereby preventing the lithium ion from being deposited as dendrites. As a result, there can be provided a highly reliable battery capable of preventing the aluminum of the positive electrode tab and the negative electrode from being brought into direct contact with each other even when the separator contracts at high temperature.

REFERENCE SIGNS LIST

10: Non-aqueous electrolyte secondary battery
20: Film-like covering material
30: Positive electrode terminal
40: Negative electrode terminal
50: Separator
60: Insulating member
70: Laminate of battery elements
72: Binding tape
100: Positive electrode
101: Positive electrode collector
102: Non-coating region
103: Positive electrode active material layer
105: High density region
107: Region where existing amount of active material is small
108: Tapered portion 109: Positive electrode lead-out tab
110: Positive electrode side joint portion
111: Step portion
113: Thin layer portion
150: Die coater
152: Backup roller
160: Slot die
161: Die head
162: Slurry
164: Discharge port
166a, 166b: Space adjusting shim
166c, 166d: Flow path limiting member
170: Compression process
172a, 172b: Roll press
200: Negative electrode
201: Negative electrode collector
203: Negative electrode active material layer
209: Negative electrode lead-out tab
210: Negative electrode side joint portion

The invention claimed is:

1. A non-aqueous electrolyte secondary battery characterized by comprising:
a negative electrode in which a negative electrode active material layer is formed on a negative electrode collector; and
a positive electrode laminated on the negative electrode through a separator, in which a positive electrode active material layer is formed on a positive electrode collector, wherein
the positive electrode active material layer on a surface of a positive electrode tab drawn from the positive electrode collector has a region which extends in a drawing direction of the positive electrode tab, exceeding a leading end line of a vertically projected negative electrode active material layer opposed to the positive electrode active material layer and in which an existing amount of the positive electrode active material layer is reduced at its leading end portion.

2. The non-aqueous electrolyte secondary battery according to claim 1, characterized in that
the region where an existing amount of the positive electrode active material layer is reduced is formed as a slope whose thickness is reduced in the drawing direction of the positive electrode tab or as a region in which an existing ratio of the positive electrode active material is reduced.

3. The non-aqueous electrolyte secondary battery according to claim 1, characterized in that
the positive electrode tab and a negative electrode tab are drawn in opposite directions to each other, and
an insulating member extending in the drawing direction of the positive electrode tab from a part of the positive electrode lead-out tab where the existing amount of the positive electrode active material is reduced is provided, the insulating member having such a thickness that an end portion of the insulating member at an opposite side to a leading end side of the positive electrode in the drawing direction reaches the negative electrode collector, exceeding a surface of the negative electrode active material of the negative electrode adjacent to the positive electrode tab in a laminating direction thereof.

* * * * *